United States Patent [19]

Woodruff

[11] Patent Number: 4,819,370
[45] Date of Patent: Apr. 11, 1989

[54] FLYING INSECT ELIMINATOR

[76] Inventor: James L. Woodruff, 854 Kealahou St., Honolulu, Hi. 96825

[21] Appl. No.: 98,788

[22] Filed: Sep. 21, 1987

[51] Int. Cl.$^4$ ............................................. A01M 01/04
[52] U.S. Cl. ......................................... 43/113; 43/139
[58] Field of Search .................. 43/107, 111, 113, 139

[56] References Cited

U.S. PATENT DOCUMENTS

| | | | |
|---|---|---|---|
| 3,020,671 | 2/1962 | Potter | 43/113 |
| 3,123,933 | 3/1964 | Roche | 43/113 |
| 3,152,420 | 10/1964 | Pawl | 43/113 |
| 3,987,578 | 10/1976 | Rueff | 43/113 |
| 4,438,585 | 3/1984 | Slatton | 43/113 |

*Primary Examiner*—Kurt Rowan
*Attorney, Agent, or Firm*—James C. Wray

[57] ABSTRACT

A fan blows air and insects in the direction of the screen. A flexible monofilament rotates adjacent the screen on the opposite side of the fan. Lights within a box attract insects, and the fan draws the insects onto the screen. The rotating monofilament kills the insects and cleans the screen, and the insects remains are swept into circular gutters and fall into a collection drawer.

18 Claims, 1 Drawing Sheet

FLYING INSECT ELIMINATOR

BACKGROUND OF THE INVENTION

An article from *Consumer Reports,* June 1982, pages 300–303 analyzes several commercial electric bug killers. Among the undesirable features of these devices are clogging by insects and difficulty in opening and cleaning them, difficulty in changing bulbs, noisiness, and ineffectiveness. Most do not kill mosquitoes, which are not attracted to ultraviolet light.

Several patents show lights in boxes and rotating monofilaments.

U.S. Pat. No. 4,356,656 has a box with two circular openings and two light bulbs inside the box. Monofilaments rotate within the circular openings to kill bugs as they enter the openings towards the lights.

U.S. Pat. No. 4,251,945 has a lantern with rotating monofilaments on its outside.

U.S. Pat. No. 4,438,585 has a horizontal ring with a circulating monofilament over bait.

U.S. Pat. No. 2,737,753 has a rotating wire over a circular fluorescent lamp.

U.S. Pat. No. 2,807,116 has a box with a fan but it traps the insects in a trap rather than killing the insects with a monofilament against the screen.

U.S. Pat. No. 3,041,773 has a box with a fluorescent light outside the box and an incandescent light inside the box. The fan draws insects into a killing device.

U.S. Pat. No. 3,123,933 has a box with a light and a horizontal fan which draws insects into horizontal spokes in a wheel. There is no screen.

U.S. Pat. No. 2,883,790 shows a fan with an attracting light and a fine mesh screen. The fan simply blows insects into the expandable screen.

U.S. Pat. No. 2,893,161 has a similar device in which a fluorescent circular tube attracts insects which are drawn in by a fan past a trap door into a collection bag.

U.S. Pat. No. 2,806,321 shows a similar device with a concentrating funnel.

Problems remain in that electronic flying insect electrocution devices are noisy and may tend to attract increased insect populations. Effective use requires location at a distance from the protected area. Non-attracted insects in the protected area are neither displaced nor destroyed. Traps and physical kill devices require frequent disassembling and cleaning.

SUMMARY OF THE INVENTION

The present invention is quiet and is intended for use in the protected area to dispose of all flying insects, including mosquitoes that may not be attracted to light.

The present invention is self-cleaning due to the rotating monofilament that sweeps the screen as it kills insects. Any residue that remains on the screen can be conveniently brushed down into the collection drawer which is easily removed and emptied.

This invention is designed to attract, kill, and dispose of a variety of flying insects, including mosquitoes, gnats, moths, and flying termites.

This invention consists of a case with a circular opening in the front and vents in the back for the passage of air. Inside the case are electric lights to attract insects to the vicinity of the front of the case. Either incandescent or fluorescent lights can be used. Both types are effective. Positioned in front of the lights is an electric fan that draws air through the circular opening of the case and expels it through the vents in the back of the case.

The purpose of the fan is to draw insects against a fine screen that is located in front of the fan. A small shaft extends from the fan hub through the screen, and attached to this small shaft is a monofilament that rotates at the fan speed less than a millimeter in front of the surface of the screen. The purpose of the monofilament is to kill insects and sweep them around and outward to a gutter located around the perimeter of the screen. The bottom of the gutter has an opening that leads to a collection drawer where the insects are deposited.

Burnt out bulbs can be replaced easily by opening the back of the case. One model has a hinged door for this purpose.

The unpleasant zapping sound of high voltage bug killers is not present in this invention. The only audible sound is the low volume whirr of the fan.

Test models have demonstrated the high degree of effectiveness of the invention. The suction produced by the fan, which draws the insects in so that they can be eliminated, is a feature not present in most commercial models.

Production costs for this invention compete successfully with those for other insect killers on the market.

This invention provides insect killing apparatus having a frame, a support connected to the frame for supporting the frame, a front face with a circular opening. A fine screen is mounted within the circular opening. A circular gutter having a U-shaped cross-section surrounds a front of the screen. A chute-like opening in a lower portion of the circular gutter and a drawer supported in the frame have an opening adjacent the chute. A motor is supported by the frame. A fan drivingly connected to the motor is positioned inside the screen and the circular opening. A shaft projects through a central opening in the screen and has mounted on a front end thereof a monofilament for rotating adjacent a front of the screen as the fan rotates adjacent a rear of the screen. Flying insects are drawn toward the screen by the fan. The monofilament rotating adjacent the outside of the screen kills insects near or on the screen and sweeps the insects into the gutter and directs the insects through the chute into an upward opening of a collection drawer for subsequent removal of the dead insect remains. Lamps are mounted within the frames. An electrical power supply connected to the lamps and to the motor supplies power to the lamps and to the motor. A relatively large aperture screen closure removably attached to a rear of the frame permits access to the lamps and permits flow through the frame of air drawn into the frame by the fan.

In the preferred apparatus, the frame is rectangular with substantially flat and rectangular top, bottom and side walls. The support comprises legs extending downward from the bottom wall and a handle centrally positioned on the top wall and extending upward therefrom. The face is generally recentangular with a circular, central cutout portion.

In the preferred apparatus, the gutter extends around the circular central cutout portion of the face and between a rear inner side of the face and a front of the screen.

Preferably, a removable circular grate is connected to the face and extends forward therefrom for preventing large objects, such as papers, from being drawn onto the screen.

Preferably, the monofilament extends generally diametrically from the shaft to positions in or substantially near the gutter.

In a preferred embodiment, the rear access screen is hinged to the frame.

The invention provides flying insect eliminating apparatus comprising a fine screen for permitting passage of air and preventing passage of flying insects. A frame supports the screen. A fan is connected to a drive motor. A support supports the fan in alignment with the screen. A shaft is positioned adjacent the screen. A motor connected to the shaft rotates the shaft. A filament connected to the shaft rotates with the shaft adjacent to the screen. Flying insects are drawn to the screen with air current produced by the fan and are killed on and adjacent the screen by the monofilament which moves adjacent the screen.

Preferably, a single motor means drives the fan and to the shaft.

Preferably, the fan and shaft are directly driven by the motor means.

In a preferred embodiment, the screen has a central opening; and the shaft extends through the central opening in the screen, and the fan and filament are mounted on opposite sides of the screen.

Preferably, a frame surrounds the screen and extends rearward therefrom and encloses the motor.

In a preferred embodiment, lamps are mounted within the frame, and a rearward door with a screen encloses the rear of the frame.

Preferably, a gutter having a U-shaped cross-section peripherally surrounds a face of the screen and ends of the monofilament.

In a preferred embodiment, a chute is connected to the gutter. A collection means mounted adjacent the chute collects remains of insects from the screen, monofilament and gutter.

A preferred method of eliminating flying insects comprises creating an air flow through a screen with a fan and rotating a monofilament adjacent and upstream side of the screen and killing insects on or near the screen.

In the preferred embodiment, the creating of the air current comprises drawing air through a screen with a fan positioned adjacent a downstream side of the screen.

A preferred construction rotates the fan and the monofilament with a single motor, with a shaft extending through a central opening of the screen.

The preferred method further comprises illuminating an inside of the frame behind the fan.

A preferred embodiment sweeps insect remains outward to a circular gutter in front of the screen with the monofilament.

The preferred method collects the insect remains in a drawer beneath the gutter.

These and other and further objects and features of the invention are apparent in the disclosure which includes the above and ongoing specification with the claims and the drawings.

DETAILED DESCRIPTION OF THE DRAWINGS

Figure 1:
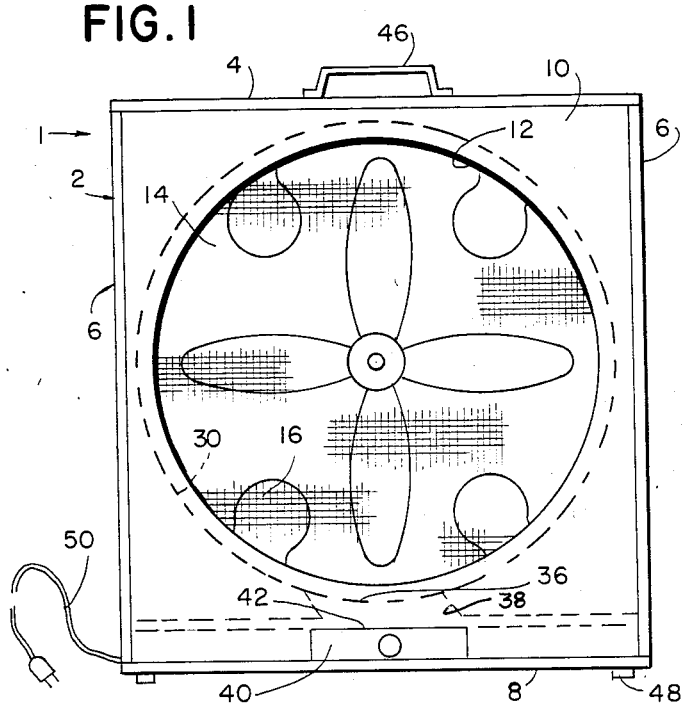
FIG. 1 is a front view of the invention.
Figure 2:
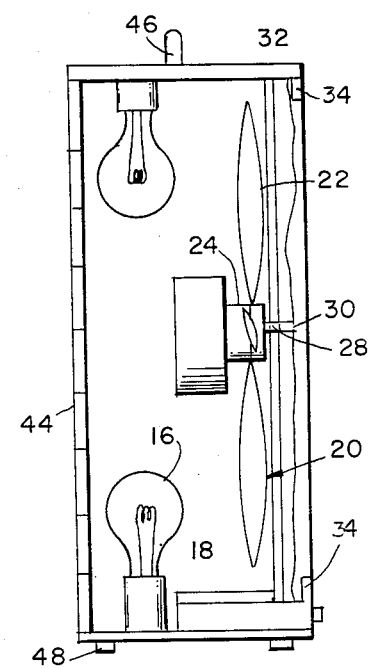
FIG. 2 is a partially cut away side view of the invention.

Referring to the drawings, insect eliminator is generally indicated by the numeral 1. A rectangular frame 2 is made of an upper wall 4, side walls 6 and a lower wall 8. A front face 10 fits within the walls 4, 6 and 8 and has a circular opening 12. A fine screen 14 behind the circular opening prevents or retards the passage of insects. Lamps 16 mounted behind the screen tend to draw interest of insects into a lighted area in front of the screen. As shown in FIGS. 1 and 2, the lighting means comprise four receptacles 18 in which incandescent bulbs 16 are mounted.

Fan 20 has multiple blades 22. Light from the incandescent lamps 16 may be periodically interrupted by the fan blades 22 which may have an effect on drawing the interest of the insects towards the eliminator as the fan blades 22 are rotated on the hub 24. A motor 26 is mounted centrally within the eliminator frame 2 on supports which are not shown for the purpose of clarity. Motor 26 directly rotates the fan hub 24 and a shaft 28 on which flexible monofilaments 30 are mounted. As shown in FIG. 1, the monofilament 30 extends entirely across the opening 12 in face 10.

Positioned peripherally inside opening 12 in front of screen 14 or preferably surrounding circular screen 14 is a gutter which has a U-shaped cross-section which opens inward toward the monofilament 30. Tips 32 of the monofilaments move within the gutter 34 as the monofilament 30 is rotated. Gutter 34 is open 36 at its bottom, and a chute 38 directs the insect remains through an upward opening 42 in collection drawer 40. As fan 20 draws the insects toward the screen 14, monofilament 30 kills the insects and sweeps them outwardly toward the gutter 34. Tips 32 of the monofilament 30 sweep through the gutter completing the destruction of any partially destroyed insect and sweeping the remains through the chute 38 into the collection drawer 40. As shown in FIG. 2, the rear large screen 44 is removable to replace lamps 16. A handle 46 is fixed centrally to the upper wall, and legs 48 are mounted on the lower wall to support the eliminator. A power cord 50 supplies operating current to the lamp receptacles 18 and to the motor 26. A large circular grid 52 may be mounted on the front face 10 in front of the central opening 12 to prevent passage of large objects, such as airborne papers to the screen 14.

Figure 3:
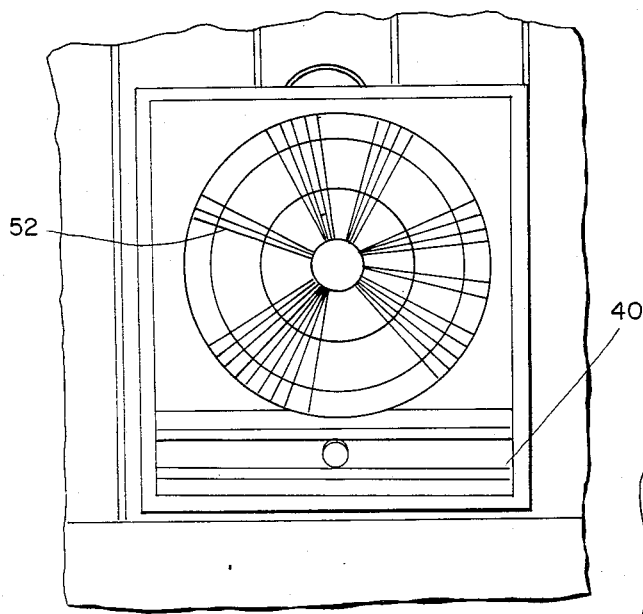
FIG. 3 is a front view of one modification of the invention.
Figure 4:
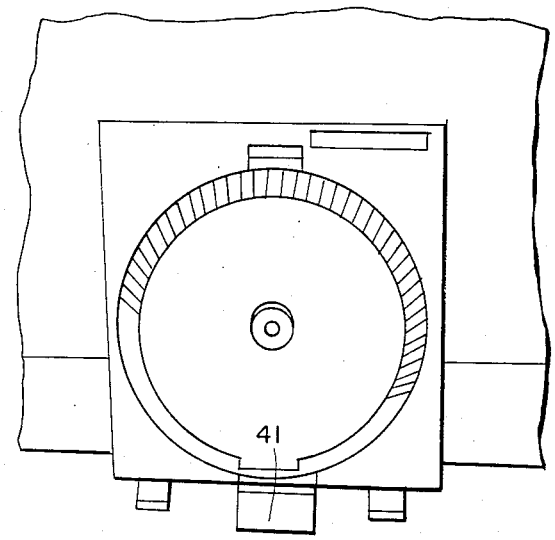
FIG. 4 is a front view of another modification of the invention.

One embodiment of the invention shown in FIG. 3 has a collection pan 41 mounted in front of the front face adjacent the gutter. Another embodiment of the invention shown in FIG. 4 has a drawer 40 which extends entirely across the front face. In both embodiments of FIGS. 3 and 4, fans are six-bladed and the ara of the fan blade covers a majority of the area of the screen. An even pressure differential is established so that airborne insects flow uniformly toward the screen. The monofilament is mounted on an extension of the fan shaft which causes the monofilament to rotate at the same speed as the fan. Since the shaft is short, the monofilament rotates less than a millimeter in front of the surface of the screen and sweeps the insect remains outward to the gutter at the perimeter of the screen and then along the gutter to the collection drawer.

While the invention has been described with reference to specific embodiments, modifications and variations of the invention may be made without departing from the scope of the invention which is defined in the following claims.

I claim:

1. Insect killing apparatus comprising a frame, support means connected to the frame for supporting the frame, a front face having a circular opening, a fine screen mounted within the circular opening, and a circular gutter having a U-shaped cross-section surrounding a front of the screen, an opening and a chute in a lower portion of the circular gutter and a collector supported in the frame having an opening adjacent the chute, a motor supported by the frame and a fan drivingly connected to the motor and positioned inside the screen and the circular opening, a shaft projecting through a central opening in the screen and a monofilament mounted on a front end of the shaft for rotating the monofilament adjacent a front of the screen as the fan rotates adjacent a rear of the screen, whereby flying insects are drawn toward the screen by the fan, and the monofilament rotating adjacent the outside of the screen kills insects near or on the screen and sweeps the insects into the gutter and directs the insects through the chute into the upward opening of the collector for subsequent removal of insect remains, lamp means mounted within the frame, an electrical power supply connected to the lamp means and to the motor for supplying power to the lamp means and to the motor and a relatively large aperture rear access screen closure releasably attached to a rear of the frame for permitting access to the lamp means and for permitting flow through the frame of air drawn into the frame by the fan.

2. The apparatus of claim 1 wherein the frame is rectangular with substantially flat and rectangular top, bottom and side walls and wherein the support means comprises legs extending downward from the bottom wall and a handle centrally positioned on the top wall and extending upward therefrom and wherein the face is generally recentangular with a circular, central cutout portion.

3. The apparatus of claim 2 wherein the gutter extends around the circular central cutout portion of the face and between a rear inner side of the face and a front of the screen.

4. The apparatus of claim 3 further comprising a removable circular grate connected to the face and extending forward therefrom for preventing large objects, such as papers, from being drawn on to the screen.

5. The apparatus of claim 1 wherein the monofilament extends generally diametrically from the shaft to positions substantially near the gutter.

6. The apparatus of claim 1 wherein the rear access screen closure is hinged to the frame.

7. Flying insect eliminating apparatus comprising a fine screen for permitting passage of air and preventing passage of flying insects, means for supporting the screen, a drive motor, a fan connected to the drive motor, drive motor and fan support means for supporting the fan in alignment with the screen, a shaft positioned adjacent the screen, rotating means connected to the shaft for rotating the shaft, filament means connected to the shaft for rotating with the shaft adjacent to the screen, whereby flying insects are drawn to the screen with air current produced by the fan and are killed on and adjacent the screen by the monofilament which moves adjacent the screen.

8. The apparatus of claim 7 wherein the rotating means comprises the drive motor drivingly connected to the fan and to the shaft.

9. The apparatus of claim 8 wherein the fan and shaft are directly driven by the drive motor.

10. The apparatus of claim 9 wherein the screen has a central opening and wherein the shaft extends through the central opening in the screen and wherein the fan and filament means are mounted on opposite sides of the screen.

11. The apparatus of claim 10 further comprising a frame surrounding the screen and extending rearward therefrom and enclosing the drive motor means.

12. The apparatus of claim 11 further comprising lamp means mounted within the frame and a rear closure with a screen for enclosing the rear of the frame.

13. The apparatus of claim 7 further comprising a gutter having a U-shaped cross-section peripherally surrounding a face of the screen adjacent the filament means.

14. The apparatus of claim 13 further comprising a chute connected to the gutter and a collection means mounted adjacent the chute for collecting remains of insects from the screen, monofilament, gutter and chute.

15. The method of eliminating flying insects comprising creating an air flow through a screen with a fan positioned adjacent and inside the screen, and rotating a monofilament adjacent and outside the screen and killing insects on or near the screen.

16. The method of claim 14 further comprising rotating the fan and the monofilament with a single motor and a shaft extending through a central opening of the screen.

17. The method of claim 14 further comprising illuminating an inside of a frame behind the fan.

18. The method of claim 14 further comprising sweeping insect remains outward to a circular gutter in front of the screen with the monofilament.

19. The method of claim 18 further comprising collecting the insect remains in a drawer beneath the gutter.

* * * * *